Aug. 10, 1965

H. G. ABBEY 3,199,843

ELECTROPLATING BARRELS

Filed July 16, 1963

INVENTOR.
HAROLD G. ABBEY
BY
Michael Ebert
ATTORNEY

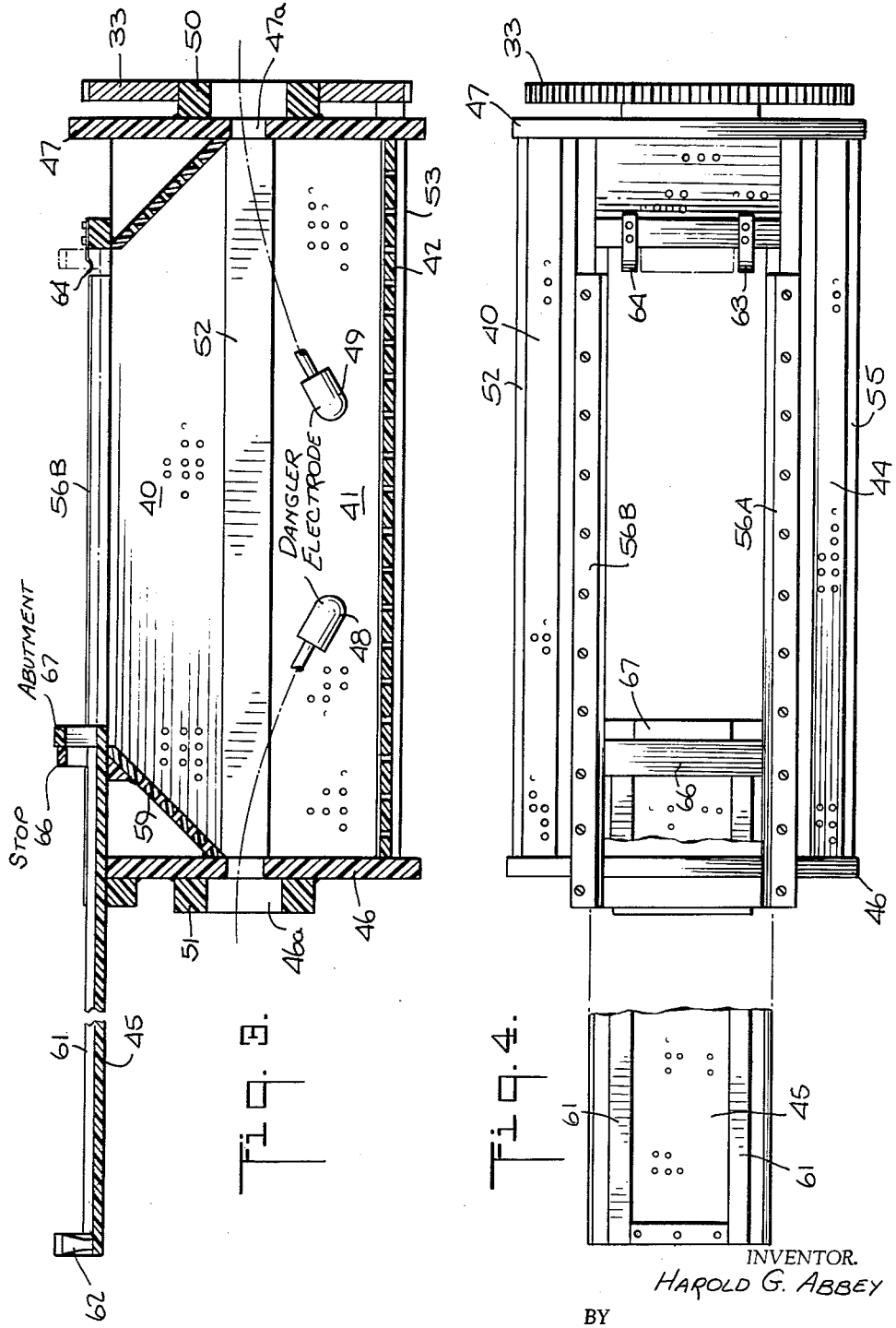

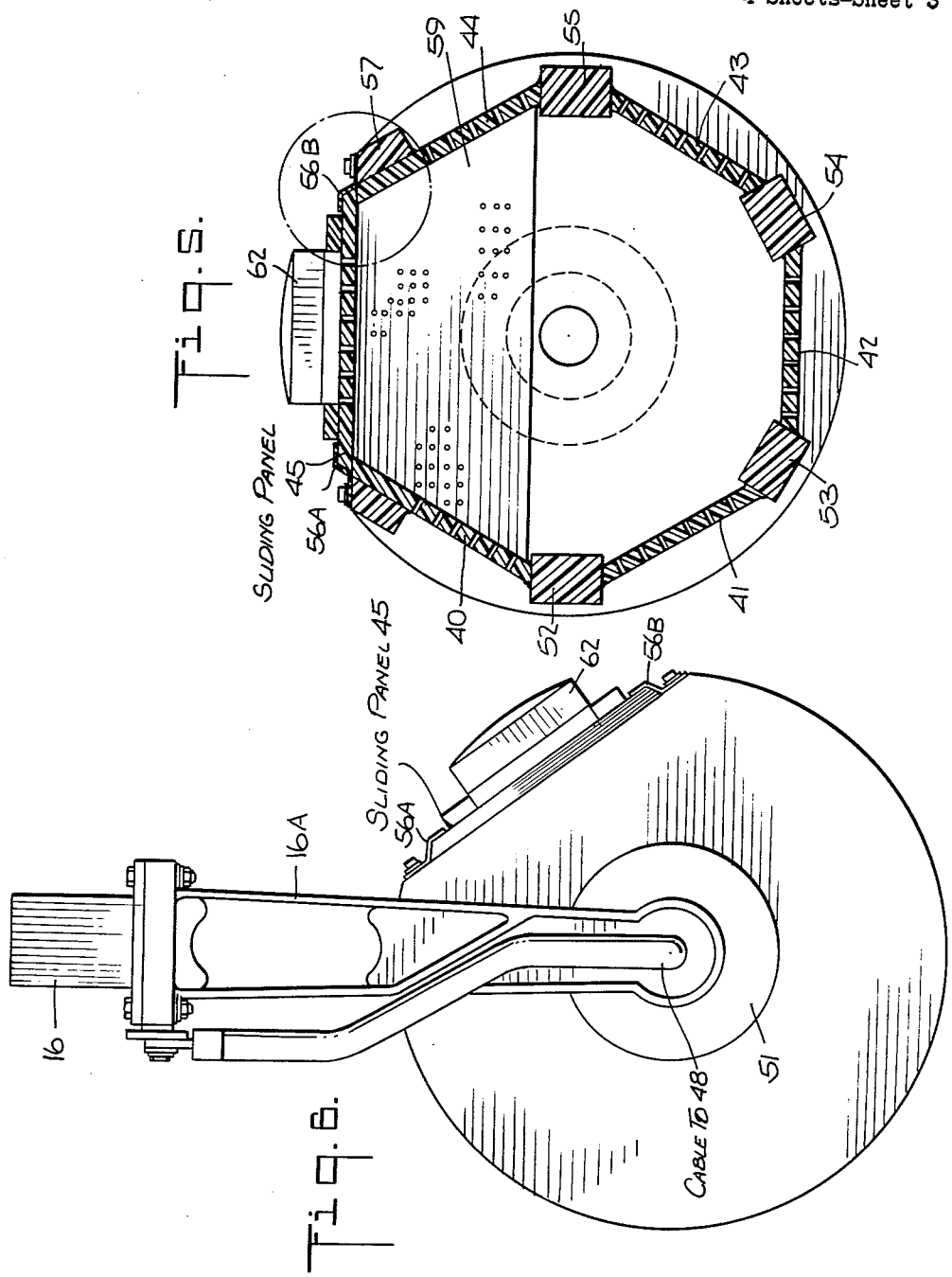

Aug. 10, 1965  H. G. ABBEY  3,199,843
ELECTROPLATING BARRELS
Filed July 16, 1963  4 Sheets-Sheet 4
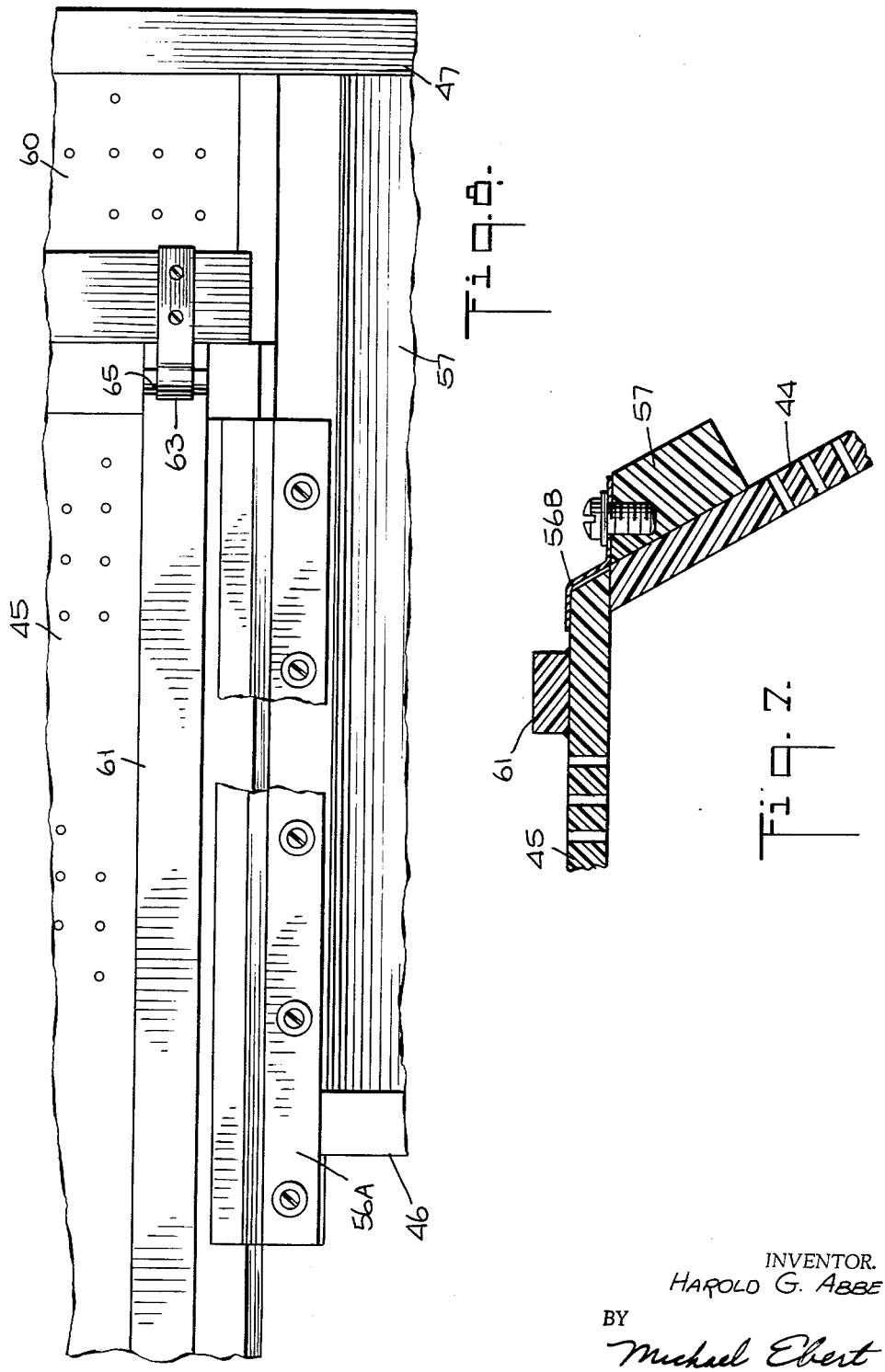
INVENTOR.
HAROLD G. ABBEY
BY
Michael Ebert
ATTORNEY United States Patent Office 3,199,843
Patented Aug. 10, 1965

3,199,843
ELECTROPLATING BARRELS
Harold G. Abbey, 189—10 Aberdeen Road,
Jamaica 23, Long Island, N.Y.
Filed July 16, 1963, Ser. No. 295,397
5 Claims. (Cl. 259—3)

This invention relates generally to metal finishing, and more particularly to improved barrel structures for efficiently tumbling a work load to be electroplated, chemically processed or otherwise finished, and adapted to facilitate the efficient automatic loading and unloading thereof.

In my United States Patents 2,854,159, 2,987,201, 2,975,882, and 2,979,181, there are disclosed conveyor structures including a plurality of work carriers movable on an overhead track for travel to various work stations therebelow, the track being provided with removable rail segments vertically aligned with the stations. Individual elevators are provided for the removable segments, the work carrier being supported on the rail segment as it is lowered by the associated elevator to a work station. Acting in conjunction with each removable segment is a substitute segment which automatically replaces the removable segment when it is lowered, thereby re-establishing the continuity of the track and permitting uninterrupted passage of carriers.

The load-carrying trolleys or carriers run on a single or double beam track and are propelled by power pushers which are not permanently connected to the carriers, hence the carriers can be switched at will from a main conveyor line onto a spur or secondary lines, all in the horizontal plane, or lowered vertically to processing or work stations below the track without interrupting the flow of the main line traffic. Such power-and-free conveyors have many advantages in manufacturing and processing operations over arrangements in which the power drive is permanently coupled to the carriers, for the carriers need not be unloaded from start to finish of the operations.

In the load-carrying trolley arrangement disclosed in the above-identified patents, the load is suspended below the trolley and is lowered by the associated elevator to a work station which in practice may be a liquid plating bath. The material to be plated is contained within a rotating barrel or cylinder which is subjected to up-and-down movement to tumble the parts in the barrel and to effect agitation of the liquid in the bath and thereby promote plating.

In order to facilitate automatic, unattended operations with a conveyor system of the above-described type, there is disclosed in my co-pending application, Serial No. 266,925, filed March 21, 1963, entitled Improved Key Card Dispatching Conveyor Systems, individual and selective control of each carrier independently of the preceding or following carriers to effect the desired dispatching and cycle destination for that particular carrier. Thus when a carrier enters a processing station, the elevator thereat is either actuated to lower the carrier for processing or it is unactuated to permit the carrier to by-pass or skip the station, depending on the cycle requirements of the system. When the system is constituted by several processing lines of different types, the carrier is directed to the desired line as well as being instructed as to the work operation cycles to be carried out in the selected line.

After the work load is placed within the rotatable barrel, it becomes possible to dispatch the barrel from a loading station and to cause the barrel to travel to a series of selected stations automatically for processing in accordance with a prearranged cycle. However, with standard commercial barrels even of the most advanced design, it is still necessary to manually load and unload the parts being processed. In many commercially available barrel structures, the barrel is composed of perforated panels in a polygonal arrangement, the panels being bolted to end plates. The polygonal form gives the most effective tumbling action, for it causes the parts to roll at a steeper slope than rounded constructions.

Access is ordinarily gained to the interior of the barrel by removing one of the perforated panels, fastening means or clamps being provided to hold the panel in place after loading. Such fastening means often take the form of resilient metal clips or bolts which must be manipulated to unlock or close the barrel.

Accordingly, it is the main object of the present invention to provide a rotary plating barrel having a sliding panel providing ready access to the barrel, and which lends itself to automatic loading and unloading of the barrel, the panel requiring no auxiliary locking or fastening means.

Also an object of the invention is to provide a polygonal barrel construction whose interior space includes slant panels so arranged as to form an internal chute which expedites the total gravity dumping of a load without dead spots or internal shelves resisting unloading. A significant feature of the invention is that the slant panels also serve to promote internal horizontal movement of the load in the course of barrel rotation, thereby improving tumbling efficiency.

Still another object of the invention is to provide a sliding panel or lid arrangement including resilient guides which facilitate movement of the panel and prevent sticking thereof, despite warpage of the barrel or lid.

For a better understanding of the invention, as well as other objects and further features thereof, reference is made to the following description to be read in conjunction with the annexed drawings wherein like components in the several views are identified by like reference numerals.

In the drawings:

FIG. 3 is a longitudinal section of a barrel construction in accordance with the invention;

FIG. 4 is a plan view of the barrel;

FIG. 5 is a cross-section taken in the plane indicated by the line 5—5 of FIG. 1;

FIG. 6 is an end view of the barrel, also showing the suspension means from the cantilever arm;

FIG. 7 is a section detail of the area encircled in FIG. 5; and

FIG. 8 is a plan detail of the lid and guide.

Figure 1:
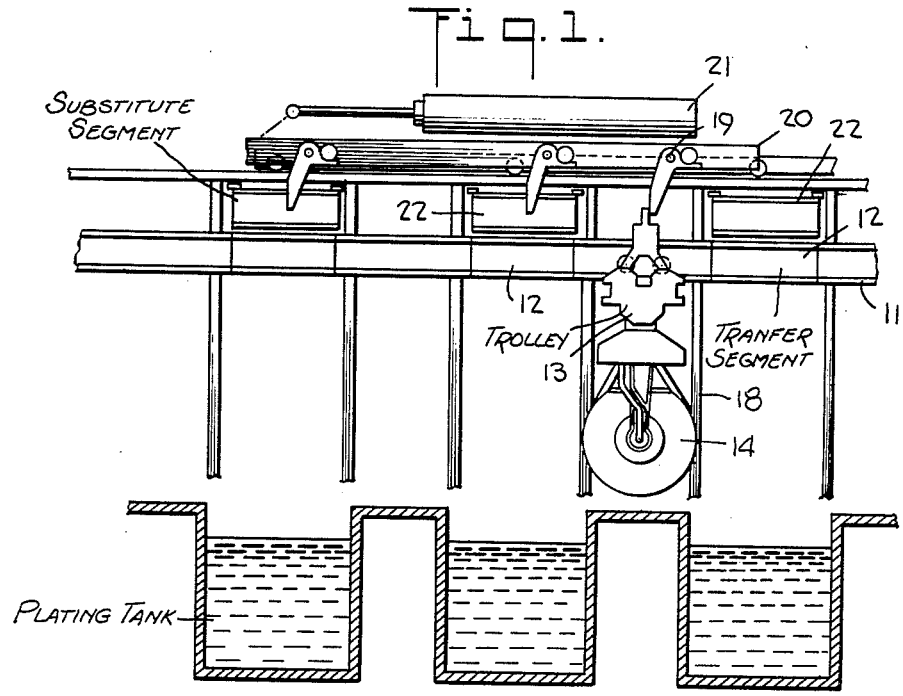
FIG. 1 is a schematic view, in front elevation, showing a small portion of a conveyor system in accordance with the invention.
Figure 2:
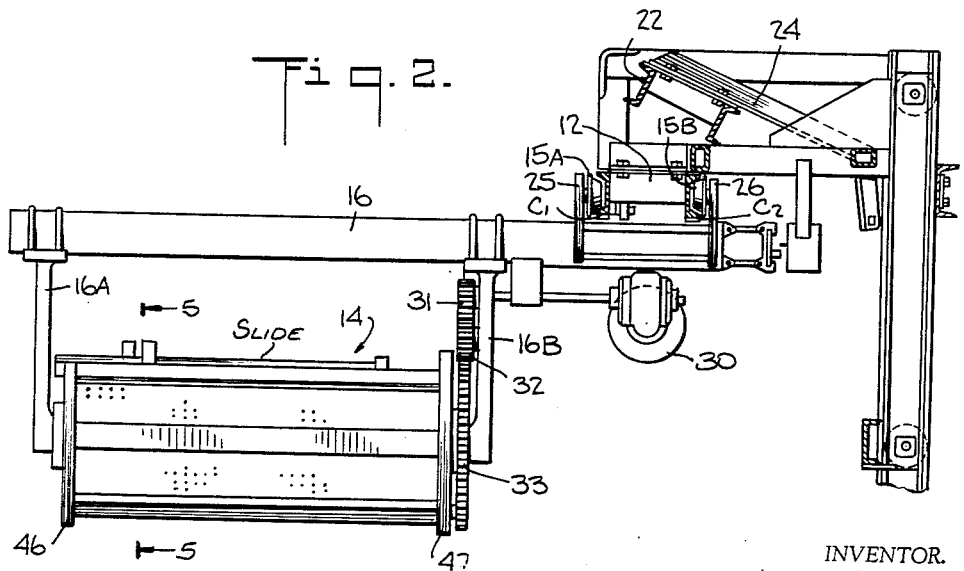
FIG. 2 is a side view showing a single trolley on a removable segment of the trackway, the trolley having a cantilever arm from which is suspended a load in the form of a rotating barrel.

FIGS. 1 and 2 show only a small section of an overhead conveyor and processing system. In practice, the complete system may take the form of a continuous oval trackway having a large number of stations for carrying out various operations such as chemical cleaning, plating, rinsing, drying, etc. The arrangement may be such that any of the work carriers is made to undergo any desired sequence of operations independently of the operating cycles of the other carriers in the system.

As shown in FIGS. 1 and 2, the overhead, horizontally extending track 10 is constituted by a fixedly supported beam 11 and includes transfer rail segments 12 which normally lie in linear registration with the trackway but are removable therefrom. The rail segments 12 are in vertical alignment with the work stations therebelow.

Travelling along the track are a plurality of work carriers 13 which support perforated cylindrical plating barrels 14 whose construction is in accordance with the invention. Carrier 13 is in the form of a trolley having two sets of wheels 15A and 15B which ride on either side of the trackway rail to transport the barrel to selected stations.

The barrel loads, as best seen in FIG. 2, are suspended from a cantilevered arm 16 extending from the trolley 13. This cantilever suspension acts to stabilize the trolley position for accurate, play-free horizontal movement. The cantilever arrangement also allows for variable size work loads with standardized modular conveying elements, reduced headroom requirements for leap-frogging, and displacement of the carrier conveyor and control mechanisms from the path of work, thereby obviating the liquid drip and contamination of the mechanisms.

Each transfer rail segment 12 is movable downwardly by means of an individual elevator riding on vertical frame beams 18. The transfer segment 12 is mechanically attached to the frame of the elevator so that when the elevator chain or cable is driven, the segment may be lowered or raised thereby, depending on the direction of drive. When the rail segment is lowered with a work carrier thereon, the plating barrel is immersed in a processing tank at the work station.

The trolleys 13 of the several work carriers are indexed or shifted in a stepwise manner along the trackway in one direction by means of spaced pusher fingers 19 which are pivotally connected to a reciprocally-operated actuator bar 20 disposed above the rail and parallel thereto. The bar 20 is slidably supported and is driven in alternate directions at timed intervals by a suitable hydraulic device 21 or other means. For each forward stroke of the bar, the pusher finger 19 advances trolley 13 from one station to the next. Stops in the form of pivotal dogs or spring-actuated detents are used for holding a carrier on a rail segment 12 or on a main track 11 to prevent displacement.

Pivotally supported above each transfer rail segment is a substitute rail segment 22 which is an exact duplicate of segment 12. The arrangement is such that when the transfer segment 12 is lowered by the elevator, the matching substitute segment 22 falls downwardly in place of the transfer segment so that no break exists in the continuity of the trackway and successive work carriers are able to proceed without interruption and skip over any work carrier which has been lowered into a work station. Thus the withdrawal of one or more work carriers from the trackway does not act to delay the transfer of other carriers.

It will be seen that trolley 13 is positioned on a removable track segment 12 and that the substituted segment 22 is raised thereabove, the substitute segment being mounted on a pivoted arm 24. The trackway including the removable and substitute segments is formed by a pair of channel members $C_1$ and $C_2$, held in spaced parallel positions by spacer plates, the channel members having upper and lower flanges.

The trolley is constituted by a pair of vertical end plates 25 and 26 held together by cross-bars, one set of wheels 15A being rotatably mounted on the outer plate and the other set 15B on the inner plate. The cantilever arm 16 is secured to plates 25 and 26 and extends outwardly from the outer plate 25.

Wheels 15A ride within channel member $C_1$ and wheels 15B ride within channel member $C_2$. The torque produced by the weight of the barrel suspended from the cantilever arm acts to force wheels 15B into engagement with the upper flange of channel member $C_2$, whereas wheels 15A are brought into engagement with the lower flange of channel member $C_1$. Thus while the diameter of the wheels is smaller than the channel passage, the arrangement is such as to eliminate any play or rocking of the trolley when in motion, for the load acts to stabilize its position on the trackway.

The barrel 14 is suspended from the cantilever arm by means of a pair of standards 16A and 16B which are coupled to the arm and extend downwardly therefrom, the standards being provided with bearings for rotatably supporting the barrel. The barrel is driven by a motor 30, suspended directly below the trolley and operatively coupled to the barrel by means of a conventional gear reduction box and a gear train composed of gears 31, 32 and 33. When the removable segment on which the trolley is placed is lowered by the elevator, the rotating barrel containing the work is received within the processing tank.

As shown in FIGS. 3 to 8, the barrel 14 is of hexagonal construction and is composed of a suitable non-conductive material of high structural strength, such as polypropylene or Lucite, the parts being bolted together or plastic-welded, or both. The barrel is made up of six perforated panels 40, 41, 42, 43, 44 and 45, in a hexagonal configuration, mounted between circular end plates 46 and 46. Each end plate has a central opening 46a and 47a through which a dangler or any other electrode 48 and 49, respectively, may be introduced for electroplating purposes.

Attached to the end plates concentrically with the openings are journal hubs 50 and 51 for receiving the standards 16a and 16b, depending from the cantilever arm 16 (FIG. 2). The gear 33 is keyed to hub 50, whereby the barrel may be driven by the motor.

As best seen in FIG. 5, all of the panels but panel 45 are joined together by horizontal bars of rectangular cross-section, which may alternatively be elliptical. Bar 52 interconnects panels 40 and 41, bar 53 interconnects panels 41 and 42, bar 54 panels 42 and 43, and bar 55 panels 43 and 44. The free panel 45 acts as a sliding lid, and it is maintained in position by spring slide guides 56A and 56B formed of a metal such as titanium, Monel, or other material which is unaffected by plating solutions. The guides 56A and 56B are bolted to horizontal bars 57 and 58 attached to the upper margins of the adjacent panels 40 and 44, whereby the lid is only free to slide in the horizontal plane. The resilience of the guides prevents sticking of the slide panel even should warpage of the barrel or lid occur.

At the side of the barrel formed by the slide panel, there is internally mounted between the end plates 46 and 47 and suitable cross-bars, two perforated slant panels 59 and 60, the ends of the slant panels being joined to the end plates at the edge of the end plate openings 46a and 47a. Thus the interior space of the barrel is defined by the walls of fixed panels 40 to 44, the walls of slant panels 59 and 60, and so much of the sliding panel 45 as stretches between the slant panels 59 and 60, all of the walls being perforated to admit the plating solution and to allow drainage. The slant panels therefore provide what is in effect a chute to facilitate unloading of parts plated within the barrel, when the lid is opened. These slant panels also act during rotation to bring about internal horizontal agitation of the load.

Mounted above the sliding panel 45 is a horizontal slat 61 positioned centrally thereof and terminating at the outer end in an upright handle 62. In practice, the handle is preferably provided with a tapered undercut so that a claw member engageable therewith to open and close the lid, may secure a positive grip thereon. Thus when the sliding panel is pulled open, it overhangs the barrel, as shown in FIG. 3.

To prevent the panel from being pulled out too far, a stop 66 is provided on one of the guides to engage a properly positioned abutment 67 on the panel, as shown in FIG. 4. The sliding panel is maintained in its closed position by a pair of spring-type detents 63 and 64 mounted above slant panel 60 and adapted to be received in a notch 65 in the slat 61, as shown in FIG. 7. Obviously, other well-known expedients may be employed to hold the slide panel in its desired position, although in practice the tension imposed on the panel by the guide strips is generally sufficient to hold the slide panel at any adjusted position.

In operation, the barrel may be conveniently loaded by turning it to a position about 40° from horizontal, as shown in FIG. 6, and sliding out the lid to give access to the interior. This opening may be carried out automatically by a pusher claw engaging the handle of the barrel. To unload, the panel 45 is first slid open and the barrel is then oriented so that its opening occupies the lowermost position, the entire load thereby being quickly dumped by gravity.

The same principles of slide panel and guide strip construction are also applicable to metal and plastic barrels of cylindrical shape. Also, the barrels may be mounted for rotation on an oblique or vertical axis, rather than horizontal, depending on processing requirements.

While there has been shown a preferred embodiment of electroplating barrel in accordance with the invention, it will be appreciated that many changes and modifications may be made therein without, however, departing from the essential spirit of the invention as defined in the annexed claims.

What is claimed is:

1. An electroplating barrel comprising a plurality of perforated panels polygonally arranged between end plates, all of said panels but one being joined together and to said end plates, guide means secured to adjacent panels engaging the edges of said one panel, whereby it is slidable relative to the other panels to permit loading and unloading of the barrel, said guide means being formed by a pair of resilient strips made of a metallic material unreactive to electroplating solutions and imposing a tension on the edges of the slidable panel sufficient to hold the slidable panel at any adjusted position thereof, the resilience of said strips preventing sticking of the slidable panel in the event of warpage.

2. In a conveyor system having a track and a trolley movable thereon, said trolley being provided with a cantilever arm, a pair of spaced standards depending from said arm, and an electroplating barrel rotatably mounted between said standards, said barrel being constituted by a plurality of perforated panels polygonally arranged between end plates, said end plates having journal hubs engaged by said standards, all of said panels but one being joined together and to said end plates, guide means secured to adjacent panels engaging the edges of said one panel, whereby it is slidable relative to the other panels to permit loading and unloading of said barrel, said guide means being formed by a pair of resilient strips made of a metallic material unreactive to electroplating solutions and imposing a tension on the edges of the slidable panel sufficient to hold the slidable panel at any adjusted position thereof, the resilience of said strips preventing sticking of the slidable panel in the event of warpage.

3. An electroplating barrel comprising
   (A) six perforated panels in a hexagonal configuration enclosed by a pair of end plates,
   (B) means joining all of said panels but one to each other and said end plates,
   (C) a pair of resilient guide strips engaging the edges of said one panel and secured to the edges of the panels adjacent thereto whereby said one panel forms a slidable lid to permit loading and unloading of said barrel, said strips imposing a tension on said lid and preventing sticking thereof in the event of warpage,
   (D) journals secured to said end plates to permit rotation of said barrel about a horizontal axis extending through said end plates,
   (E) and a pair of slant panels angularly mounted on said end plates and extending to said lid to define a chute facilitating unloading of a load when said lid is slid open, said slant panels acting during rotation of the barrel to agitate the load.

4. A barrel as set forth in claim 3, wherein said barrel is made entirely of polypropylene.

5. A barrel as set forth in claim 3, further including detent means to maintain the slide panel in its closed position.

References Cited by the Examiner

UNITED STATES PATENTS

| 817,832 | 4/06 | Backus | 204—214 |
|---|---|---|---|
| 2,836,400 | 5/58 | Jackson | 204—213 |
| 3,022,881 | 2/62 | Harper | 198—19 |

FOREIGN PATENTS 498,324  5/30  Germany.

SAMUEL F. COLEMAN, *Primary Examiner.*

WILLIAM B. LA BORDE, *Examiner.*